(12) United States Patent
Kinoshita et al.

(10) Patent No.: US 10,076,707 B2
(45) Date of Patent: Sep. 18, 2018

(54) VIDEO GAME WITH DYNAMIC QUEST CLUES BASED ON NUMBER OF COMPLETIONS

(71) Applicant: CAPCOM CO., LTD., Osaka (JP)

(72) Inventors: Kento Kinoshita, Osaka (JP); Seiji Hamajima, Osaka (JP); Akira Tamura, Osaka (JP)

(73) Assignee: CAPCOM CO., LTD., Osaka-Shi, Osaka (JP)

( * ) Notice: Subject to any disclaimer, the term of this patent is extended or adjusted under 35 U.S.C. 154(b) by 54 days.

(21) Appl. No.: 15/120,569

(22) PCT Filed: Feb. 24, 2015

(86) PCT No.: PCT/JP2015/055242
§ 371 (c)(1),
(2) Date: Dec. 1, 2016

(87) PCT Pub. No.: WO2015/129690
PCT Pub. Date: Sep. 3, 2015

(65) Prior Publication Data
US 2017/0072313 A1    Mar. 16, 2017

(30) Foreign Application Priority Data

Feb. 25, 2014  (JP) .................................. 2014-034312

(51) Int. Cl.
*A63F 13/02* (2006.01)
*A63F 9/24* (2006.01)
(Continued)

(52) U.S. Cl.
CPC .......... *A63F 13/5375* (2014.09); *A63F 13/30* (2014.09); *A63F 13/67* (2014.09); *A63F 13/69* (2014.09); *A63F 13/822* (2014.09)

(58) Field of Classification Search
CPC .......... A63F 13/60; A63F 13/69; A63F 13/79; A63F 13/822
See application file for complete search history.

(56) References Cited

U.S. PATENT DOCUMENTS

| 2004/0143852 A1* | 7/2004 | Meyers | A63F 13/12 725/133 |
| 2008/0059304 A1* | 3/2008 | Kimsey | A63F 13/12 705/14.12 |

(Continued)

FOREIGN PATENT DOCUMENTS

JP    2012-115534 A    6/2012

*Primary Examiner* — Lawrence Galka
(74) *Attorney, Agent, or Firm* — IP Business Solutions, LLC (57) ABSTRACT

A game system including a server device connected to a network and one or more terminal devices operated by users and executing a video game that a player character plays a quest in a game space which has a quest data storing unit which stores quest data, a playing status storing unit which stores playing status of the quest, a quest control unit which permits the start of the quest and a hint control unit which notifies the information for the starting conditions. The playing status storing unit acquires the playing status from the quest control unit and updates the playing status, and the hint control unit determines the information for the starting conditions based on the playing status.

8 Claims, 9 Drawing Sheets

(51) Int. Cl.
*A63F 13/5375* (2014.01)
*A63F 13/822* (2014.01)
*A63F 13/69* (2014.01)
*A63F 13/30* (2014.01)
*A63F 13/67* (2014.01)

(56) References Cited

U.S. PATENT DOCUMENTS

| | | | | |
|---|---|---|---|---|
| 2012/0015742 A1* | 1/2012 | Vanbragt | ............... | H04W 4/206 |
| | | | | 463/42 |
| 2012/0052956 A1 | 3/2012 | Yokoyama et al. | | |
| 2013/0288757 A1* | 10/2013 | Guthridge | ............... | A63F 13/12 |
| | | | | 463/2 |
| 2014/0031130 A1* | 1/2014 | Janakiraman | ........... | A63F 13/12 |
| | | | | 463/42 |
| 2014/0057717 A1* | 2/2014 | Yoshikawa | .............. | A63F 13/35 |
| | | | | 463/31 |
| 2014/0066176 A1* | 3/2014 | LeTourneau | ............ | A63F 13/60 |
| | | | | 463/23 |
| 2014/0357356 A1* | 12/2014 | Horie | ...................... | A63F 13/00 |
| | | | | 463/31 |

* cited by examiner

QUEST TABLE

| QUEST ID | PLACEMENT TERM | PLACEMENT LOCATION | HINT DATA | QUEST DATA | NUMBER OF TIMES CLEARING THE QUEST |
|---|---|---|---|---|---|
| XXX | YY/MM/DD ~ YY/MM/DD | (X,Y,Z) | There is someone in trouble in the northern plain. ---- There is someone in trouble since the monster is seen now and then at the plain AAA in the northern territory. | · STARTING CONDITIONS<br>· CLEARING CONDITIONS<br>· REWARD<br>... | 47 TIMES |
| YYY | ... | ... | ⋮ ---- ⋮ | · STARTING CONDITIONS<br>· CLEARING CONDITIONS<br>· REWARD<br>... | 151 TIMES |
| ... | ... | ... | ⋮ ---- ⋮ | ... | ... |
| ⋮ | ⋮ | ⋮ | ⋮ ---- ⋮ | ⋮ | ⋮ |

VIDEO GAME WITH DYNAMIC QUEST CLUES BASED ON NUMBER OF COMPLETIONS

TECHNICAL FIELD

The present invention relates to a game system and a game program which makes a user play a video game to clear the task.

BACKGROUND OF THE INVENTION

There has been a video game which can be played by clearing multiple quests by a user character. Quest means a kind of play to clear the task (assignment) given to the user (user character). For example, a quest would be to collect certain items or to defeat a certain monster. A reward such as items which may be used in the game will be provided to a user character when an assignment is cleared (successful).

Starting conditions need to be met in order to receive (start) an order for such quest. Starting conditions are to receive a quest request by talking to a non-player character standing in a predetermined place, to confirm (select) a quest posted on a bulletin board in the game or to go to a certain place such as a dungeon.

A game which allows such quest to be an online game in which multiple users (player characters) cooperate in a single game space in order to proceed the game (for example Patent Literature No. 1). The online game is provided through a network bandwidth to a terminal device which is operated by a user with a server device. The server device is controlled by the game operator. A game operator continuously distributes a new quest in order to avoid the users from getting bored.

PRIOR ART REFERENCE

Patent Literature

Patent Literature No. 1: Japanese Patent Application Publication No. 2012-115534

SUMMARY OF INVENTION

Technical Problem

Quest continuously distributes various contents such as an assignment and basically most of them allows the user to receive rewards by clearing the assignment. Most of the starting conditions for the quest are expressly shown in order to easily specified by the users. Therefore playing the quest sometimes felt a bit tedious.

The purpose of the present invention is to provide a game system and a game program which will improve the attractiveness of the play to clear the assignment in the video game which allows the user to clear the assignment.

Solution of Problem

A game system including a server device connected to a network provided by the first aspects of the invention and one or more terminal devices operated by users and executing a video game that a player character plays a quest in a game space has a quest data storing unit, a playing status storing unit, a quest control unit and a hint control unit.

The quest data storing unit stores the quest data including starting conditions for the player character to start the quest.

The playing status storing unit stores playing status of the quest of the player character.

The quest control unit permits the start of the quest when the player character has met the starting conditions.

The hint control unit notifies the information for the starting conditions based on the quest data to the user through the terminal device.

The playing status storing unit acquires the playing status from the quest control unit and updates the playing status and in the hint control unit determines the information for the starting conditions based on the playing status.

The playing status storing unit may store information that the quest is cleared (hereinafter clearing status) as the playing status.

The clearing status is an accumulated number of times clearing the quest or an accumulated number of the player character clearing the quest, and the hint control unit may determine the information to define the starting conditions according to the increase of the accumulated number of times clearing the quest or the accumulated number of the player character clearing the quest.

The terminal devices are connected to the server device through the network and have each player character, which is operated by each user through the terminal device in the common game space, play the quest, and the playing status storing unit may accumulate the number of times clearing the quest or the number of the player character clearing the quest only for the first time each player character has cleared.

The quest data may include the plurality of reward data provided to the player character when clearing the quest in each and every quest.

The quest control unit further comprises a playing status notifying unit notifying the information for the current playing status or the reward based on the playing status to the user through the terminal device and the quest control unit may provide the reward based on the playing status at the point of clearing the quest to the player character clearing the quest.

The quest data storing unit and the playing status storing unit are equipped in the server device and the quest control unit and the hint control unit may be equipped in the server device or in the terminal device.

A game program provided by the second aspect of the invention making a server device, which is connected to one or more terminal devices operated by one or more users via network and is included in a game system that executes a video game making a player character operated by one of the user through one of the terminal device play a quest in a game space, function as;

a quest data storing unit reading a quest data from a data storing part including starting conditions for the player character to start the quest;

a playing status storing unit storing playing status of the quest of the player character in the data storing part;

a quest control unit permitting the start of the quest when the player character has met the starting conditions;

a hint control unit notifying the information for the starting conditions based on the quest data to one of the user through one of the terminal device and the playing status storing unit acquires the playing status from the quest control unit and updates the playing status in the data storing part and the hint control unit determines the information for the starting conditions based on the playing status.

Effect of the Invention

The notification to the user regarding the starting conditions in the video game to clear the quest according to the embodiment of the present invention is determined according to the playing status.

For example, if the accumulated number of times to clear the quest is not high (the number of users clearing the quest is little), the user shall be notified a starting conditions difficult to specify.

If the accumulated number is high (the number of users clearing the quest is high), the user shall be notified a starting conditions easy to specify.

As a result, the notification to the user may provide a new amusement due to providing a purpose to search a play (starting conditions) to clear the quest from the notified information, and may enhance the attractiveness of the play to clear the quest.

DESCRIPTION OF EMBODIMENTS

The game system 1 and game program 230 made for carrying out the embodiment of the invention is explained hereto by referring to the diagram.

This is not limited to how it is carried out according to the embodiment of the present invention. Moreover, the handling procedures in each of the flowchart are in no particular order so long as it is not limited to how it is carried out and does not cause contradiction.

Figure 1:
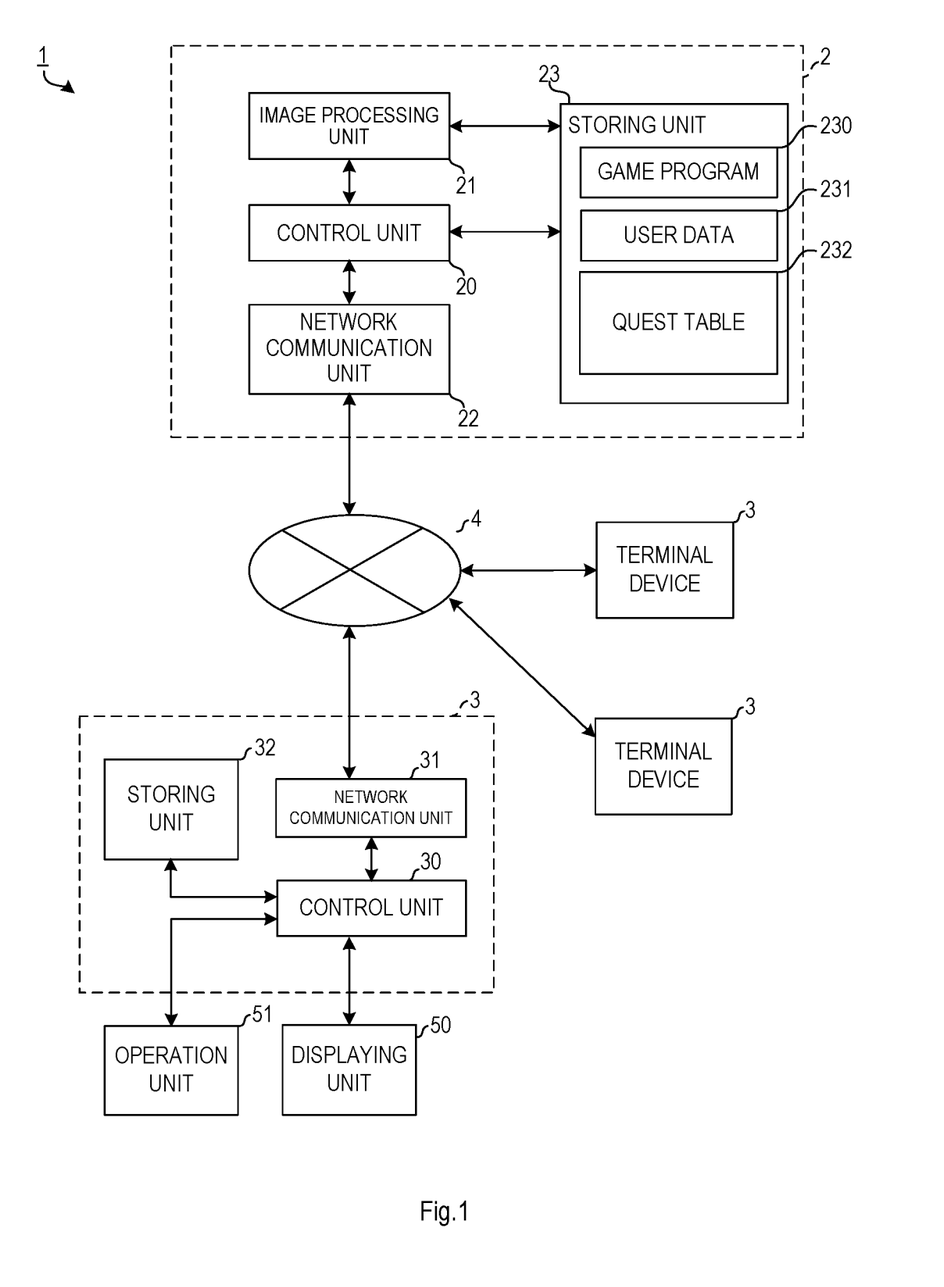
FIG. 1 is a block diagram illustrating the game system of the present invention.

FIG. 1 is a block diagram illustrating the game system 1 of the embodiment of the present invention.

The game system 1 includes a server device 2 and terminal devices 3 which can be mutually communicated through network 4.

An online game is proceeded by clearing the quest in game system 1.

The online game may be referred to as the game hereafter.

This type of online game is a Massively Multiplayer Online (MMO) type video game played in a one virtual game space by each of the player character operated by each of the individual multiple users (a terminal device 3).

The game is proceeded by clearing the quest in the game by the player character operated by each users.

The quest is an event in the game which proposes a certain assignment (clearing conditions) to the player character and provides the predetermined reward to the player character when the assignment is accomplished.

In other words, quest is a kind of game to clear the assignment.

Clearing conditions include collecting certain items in the game space or to defeat or to capture certain enemy monster.

The player character may obtain the reward by taking actions in order to clear the clearing conditions of the quest.

The reward for clearing the quest includes those items which may be used in the game space.

Quest is placed (setup) in a predetermined place (starting region 201: referring to FIG. 2) in the game space and the player character (user) accepts the quest when certain starting conditions are met.

Accepting the quest means to obtain a qualification for clearing the quest.

Figure 2:
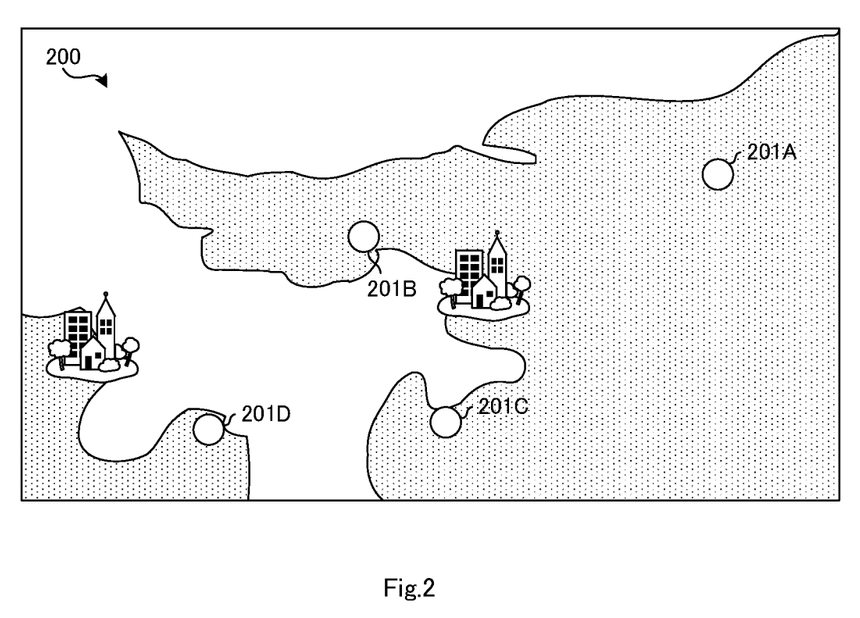
FIG. 2 is a diagram illustrating an overhead view of part of a "game field 200".

Starting conditions include moving the player character to starting region 201 or to move and to have the player character talk to the non-player character which is placed in the starting region 201.

Multiple quests with different clearing conditions and rewards are placed in the game space.

Multiple quests may be placed in a different region at the same time or may be placed on the same region or various places at the different timing.

Clearing conditions or rewards for one quest may vary according to the timing.

The placement (set up) of the quest in the game space may be carried out by server device 2.

The server device 2 may be managed by the game operator and the clearing conditions, rewards, location of the place and the term for the placement of the quest may also be placed (set up) by the operator.

The following are the explanation for accepting (starting) the quest.

Quest is placed (set up) in the starting region 201 (201A~201D) where there are over 200 game fields (game space) as referred in FIG. 2.

The starting conditions must be met in order to accept the quest by the users such as moving the player character to the starting region 201.

FIG. 2 is a diagram illustrating an overhead view of part of the game field 200.

Starting region 201 A~201 D is shown on a game field 200 of FIG. 2 as a matter of convenience, however it is not shown on the actual game screen. The starting region is not limited to the 4 places as shown on FIG. 2.

A different quest is placed (set up) for each starting region 201 A~201 D illustrated in FIG. 2.

For example, the starting condition for the quest placed (set up) in the starting region 201 A is to have the player character talk to the non-player character placed in the middle of region 201 A by replacing its position.

The starting condition for the quest placed (set up) in the starting region 201 B is for example, to have the player character replacing its position within region 201 B.

In other words, the quest begins when the player character is placed to starting region 201 B.

The user finds the starting conditions by accident or by design by moving its player character within the game space.

The user finds the starting region 201 by accident or by design by moving the position of its player character within the game space since the starting condition of the quest is mainly to relocate the player character to the starting region 201.

It is very helpful for the users to have some information on the starting conditions of the quest.

Figure 3A:
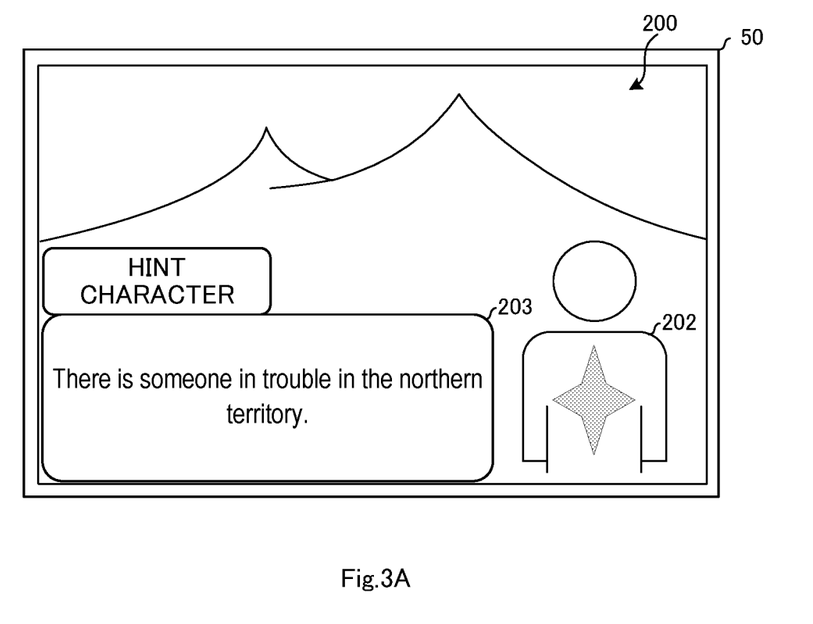
FIG. 3A is a diagram illustrating game screen image shown on the monitor (display) connected to the terminal device.
Figure 3B:
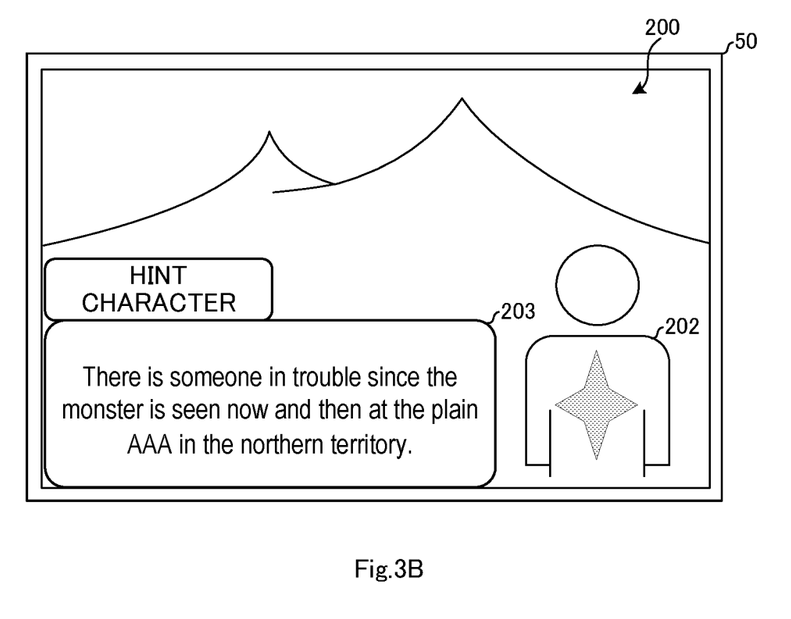
FIG. 3B is a diagram illustrating game screen image shown on the monitor (display) connected to the terminal device.

The information for the starting conditions of the quest may be obtained from a hint character (non-player character) 202 as illustrated in FIGS. 3A and 3B.

FIGS. 3A and 3B illustrates the game screen image indicated on the monitor (displaying unit 50) connected to terminal device 3.

FIGS. 3A and 3B illustrates the status when the information for the quest placed (set up) in the starting region 201A is shown on the game screen.

The hint character 202 exists in the predetermined place in the game field 200 and tells the information for the quest as illustrated in FIGS. 3A and 3B when the player character talks to (make request for the information for the quest) the hint character.

In other words, the conversation between the player character and the hint character 202 is shown on the conversation window 203 of the FIGS. 3A and 3B.

The information for the starting condition (hint) for the quest is included in this conversation.

In the case when a multiple quests are placed in the region, the user may select the desired quest option by handling an operation unit 51 and display the information for this quest since the conversation including the options for the quest will be shown on the screen.

The hint obtained from the hint character 202 varies according to whether the quest is in an undisclosed status or in a disclosed status.

The hint character 202 is speaking of the information for the quest that is "to help the one in trouble by defeating the predetermined monster at the plain AAA in the northern territory" as illustrated in FIGS. 3A and 3B.

The clearing condition for this quest is to defeat (hunt) the predetermined monster and the starting condition for this quest is to go to the person in trouble (starting region 201) and to talk to that person.

Finding the person in trouble (starting region 201) is to find the quest.

FIG. 3A illustrates the conversation of the hint character 202 when the quest is in an undisclosed status.

FIG. 3B illustrates the conversation of the hint character 202 when the quest is in a disclosed status.

Undisclosed status is when the accumulated number of time succeeded in clearing the quest from the start of the distribution of the quest is below a certain number (example 100 times).

In other words, it is in a status when not many users (player character) have succeeded in clearing the quest due to not be able to find the quest.

On the other hand, disclosed status is in a status when the accumulated number of times succeeded in clearing the quest from the start of the distribution of the quest is over a certain number.

In other words, it is in a status when many users have succeeded in clearing the quest.

The target for the number of times succeeded in clearing the quest is all the users playing the game.

The accumulated number is counted for a number of times even if the same user succeeded in clearing the quest for a number of times.

The information "there is someone in trouble in the northern territory" shown on the conversation window 203 of FIG. 3A illustrates that there is a person in trouble (non-player character) somewhere north in the game field 200.

However it is difficult to find the quest only from this information.

The information "there is someone in trouble due to infest of monster at the plain AAA in the northern territory" shown on the conversation window 203 of FIG. 3B illustrates a more detailed information for the quest compared to the conversation window 203 of FIG. 3A and allows to specify that "someone in trouble" included in the starting condition is at the plain AAA in the northern territory.

This is much easier to find the quest.

It is difficult to find the quest information since the user has to search for this quest (starting region 201) by guessing where it is located in the game field 200 if the quest is in an undisclosed status.

On the other hand, it is easy to find the information from the quest information provided by the hint character 202 if the quest is in a disclosed status.

In other words, it is easier to find the quest according to the number of times succeeded in clearing the quest.

As a result, the user may enjoy searching (finding) the quest if the quest is in an undisclosed status.

Even if the user was unsuccessful in finding the quest, they may be able to easily find the quest based on the information provided by the hint character 202 by changing the status of the quest to disclosed status eventually.

If the user succeeded in clearing the quest in an undisclosed status, they will be provided a first come, first served clearing bonus as a special reward in addition to the usual reward.

On the other hand, if the user succeeded in clearing the quest in a disclosed status, they will only be provided a usual reward and no first come, first served clearing bonus will be obtained.

An example for the first come, first served clearing bonus is a rare item not able to obtain from the usual reward.

Therefore, the user will not only aim to play the game by clearing the quest but also aim to find the quest as quickly as possible and to obtain as much reward as they can.

In other words, to find the quest in an undisclosed status and to clear them will become a huge motivation for the users for playing the game.

In order to obtain the first come, first served clearing bonus, the quest need to be in an undisclosed status when clearing the quest.

In other words, even if the quest is in an undisclosed status upon its acceptance and the conversation of the hint character 202 is as illustrated in FIG. 3A, there will be no first come, first served clearing bonus provided if the quest is in a disclosed status (due to first cleared by the other user) at the time of clearing the quest.

The timing for making decision for providing the first come, first served clearing bonus will be explained in detail by referring to FIG. 4.

Figure 4:
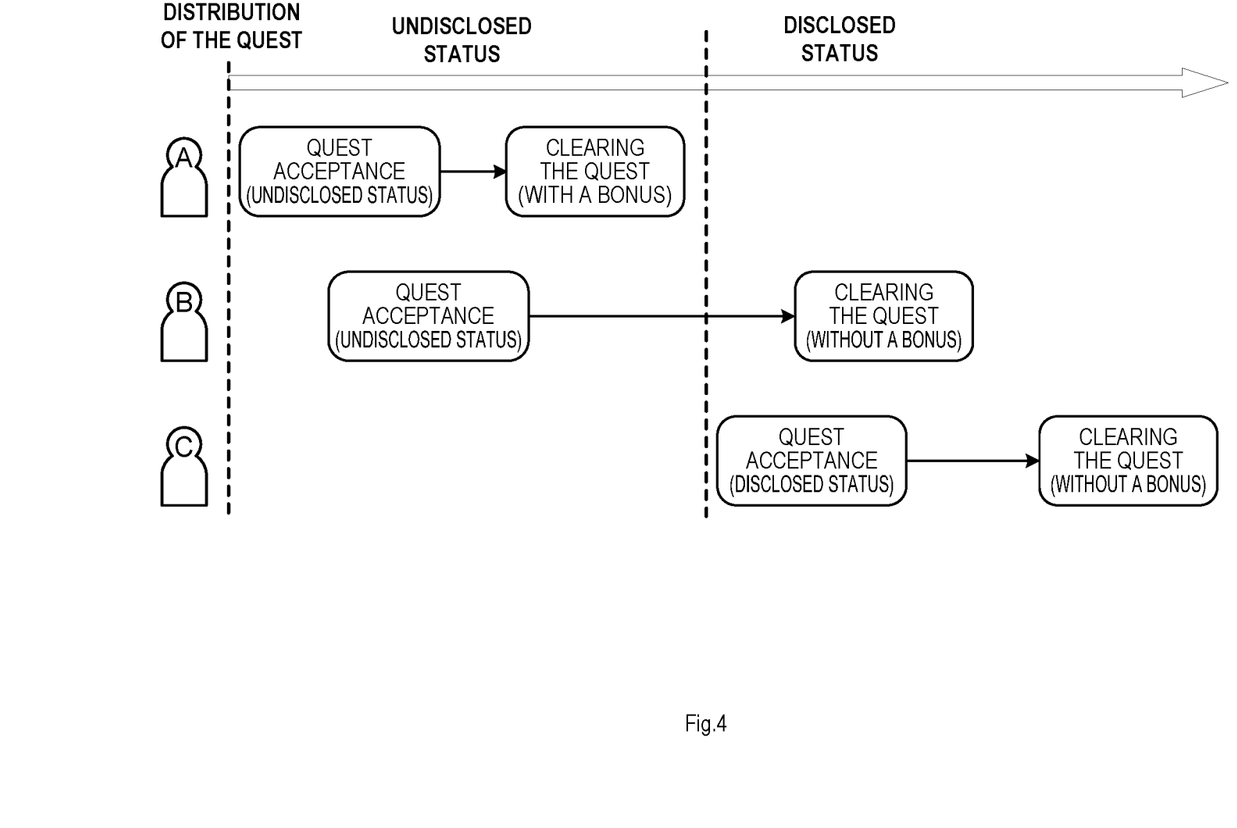
FIG. 4 is a timing diagram illustrating the timing for deciding the first number of players clearing the quest to provide the bonus.

FIG. 4 is a timing diagram explaining when to provide the first come, first served clearing bonus.

For example, in the case of user A, first come, first served clearing bonus will be provided since the quest is in an undisclosed status at the time of both accepting the quest and clearing the quest.

On the other hand, in the case of user B, first come, first served clearing bonus will not be provided since the quest was in a disclosed status at the time of clearing the quest, even though the quest was in an undisclosed status at the time of accepting the quest.

In the case of user C, first come, first served clearing bonus will not be provided since the quest was in a disclosed status at the time of accepting the quest.

The timing for when to provide the first come, first served clearing bonus is not limited to these cases.

It may be at the time of accepting the quest.

The starting condition for the quest is not limited to the above mentioned conditions.

It may be handing over a certain item to a predetermined non-player character.

The starting condition may be acquiring a certain item on the game field.

In order to practice the game, a control unit 20, an image processing unit 21, a network communication unit 22 and a storing unit 23 is included in the server device 2 as illustrated in FIG. 1.

The server device 2 sends the game screen image of the game to terminal device 3 through network 4.

The terminal device 3 shows the game screen image which was received from server device 2 on the displaying unit 50.

The user operates the player character by looking the game screen image on the displaying unit 50 through the operation unit 51.

The terminal device 3 sends the manipulating signal of the operation unit 51 to server device 2.

The control unit 20, includes Central Processing Unit (CPU), Randum Access Memory (RAM), Read Only Memory (ROM) and controls the movement of the whole device by executing the system program stored in the ROM.

The control unit 20 executes the game program stored in the storing unit 23 and controls the progress of the game based on the manipulating signal received from the terminal device 3.

A Graphic Processor Unit (GPU) is included in the image processing unit 21 and generates the game screen image of the game based on the order from the control unit 20.

The network communication unit 22 controls the communication between other terminal device 3 through the network line 4 such as the Internet and sends out the data for the game screen image.

Detailed explanation is to be omitted hereafter since the technology for the game execution process such as generating the game screen image is a public domain.

The storing unit 23 includes a database device, a hard disc and RAM and stores a game program (software) 230, a user data 231 and a quest table 232.

A program for executing the game and necessary data to execute the game are included in the game program 230.

The information for each user playing the game is stored in the user data 231.

For example, a user ID and a save data is included in the information.

The user ID is identification information set for each individual users.

The user may log in to the game by sending its user ID and password from terminal device 3 to server device 2.

The server device 2 executes the game by referring to the corresponding user data to user ID.

The save data is a data which stores the live score at the point when a user is quitting the game during its play.

Figure 5:
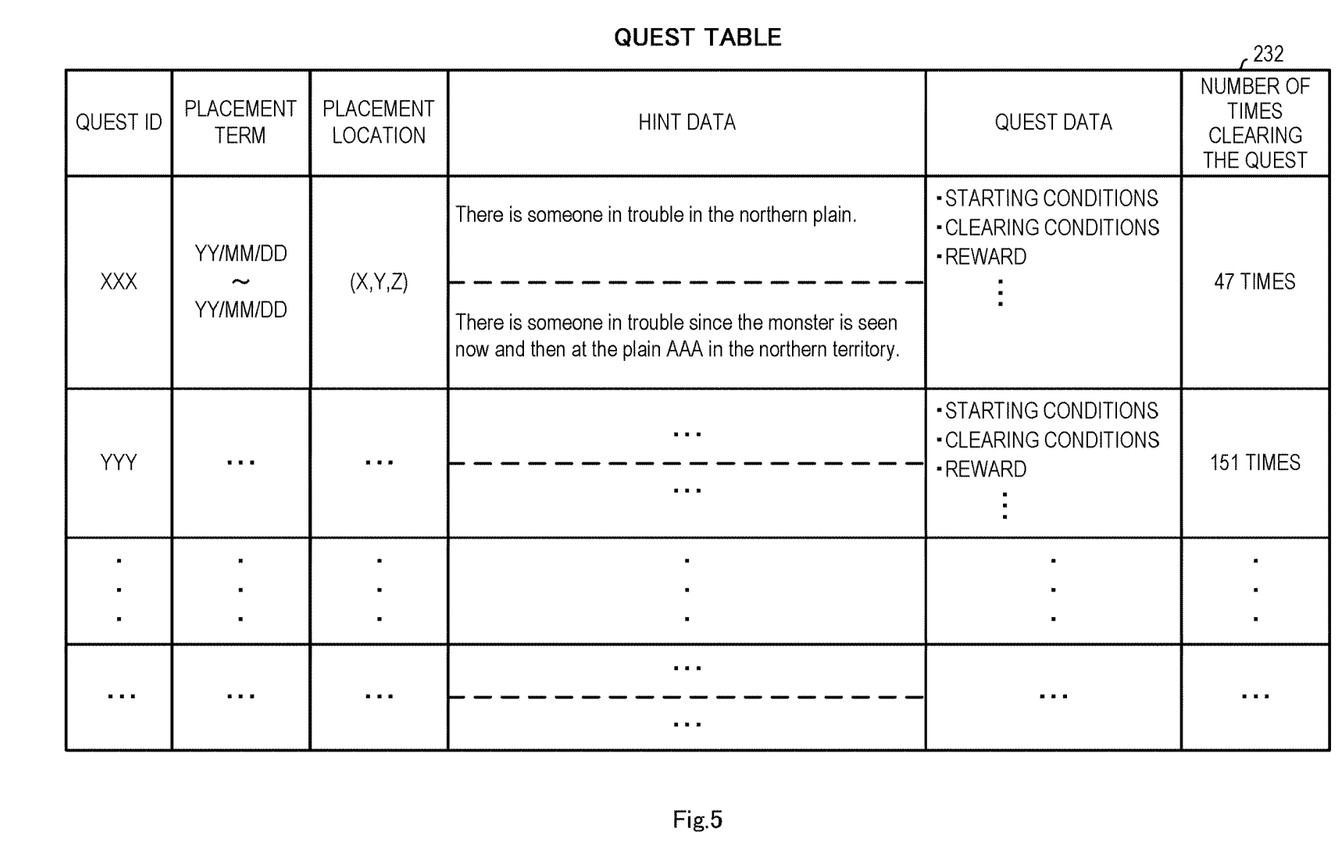
FIG. 5 is a diagram illustrating a quest table stored in the storing section according to an embodiment of the server device.

The quest table 232 stores information on the quest as illustrated in FIG. 5.

FIG. 5 is a diagram illustrating an example of a quest table stored in the store unit 23 in the server device 2.

A quest ID, a placement term (distribution term), a placement location, a hint data, the quest data and the number of times quest is cleared is included.

The quest ID is an identification information set for each individual quest.

When user (player character) accepts the quest, the corresponding quest ID is stored in the user data as the accepted quest.

The placement term allows the user (player character) to accept the quest.

The placement location is a coordinate information designates the location on the game field 200 where the quest is placed.

In other words the placement location shows the center of the starting region 201.

The game field 200 is defined by the world coordinate system made by xyz-axis.

The coordinate information of the world coordinate system is stored in the placement location.

The hint data is the conversation information (text data) of the hint character 202.

A conversation information of the quest in an undisclosed status or in a disclosed status is stored in the hint data.

Variety of data in order to execute the quest from the beginning till the end is stored in the quest data.

For example, starting conditions, clearing conditions and reward for the quest are included in the quest data.

Starting condition means the information of the starting condition for the quest.

The clearing condition means the information of the clearing condition (assignment) for the quest.

The reward means the information for the first come, first served clearing bonus and the usual bonus.

Information for designating the non-player character in the starting condition of the quest and designating the enemy monster appearing in the game field upon execution of the quest is also included in the quest data.

Number of times clearing the quest is the accumulated number of times clearing the quest after the distribution of the quest has begun.

The server device 2 function as a quest data storing unit, playing status storing unit, a quest control unit and a hint control unit by coordinating with the game program 230.

The following are the explanation for the terminal device 3.

The control unit 30, a network communication unit 31 and a storing unit 32 is included in the terminal device 3 as illustrated in FIG. 1 which is a home video game machine device or personal computer.

There are three terminal device 3 illustrated in FIG. 1, however a multiple terminal device 3 may be connected to the network line or only one terminal device may be connected to the network line.

The multiple terminal device 3 need not to be limited to the same type of devices but may be a different type of devices.

The control unit 30, includes CPU, RAM, ROM and controls the movement of the whole device by executing the system program stored in the ROM.

The control unit 30 executes the program (software) for controlling the game stored in storing unit 32 and controls the game at terminal device 3 such as displaying the game screen image executed by server device 2 on displaying unit 50 or sending the operation signals of operation unit 51 to server device 2.

The network communication unit 31 controls the communication between server device 2 through network line 4 and sends the operation signals to the server device 3.

The storing unit 32 includes hard disc and RAM and stores the control program for games.

The terminal device 3 is connected to displaying unit 50 and operation unit 51.

Displaying unit 50 is a liquid-crystal display and displays the game screen image generated by server device 3.

The operation unit 51 is a controller (hardware) for games and receives the manipulated input by the users for the player character.

Figure 6:
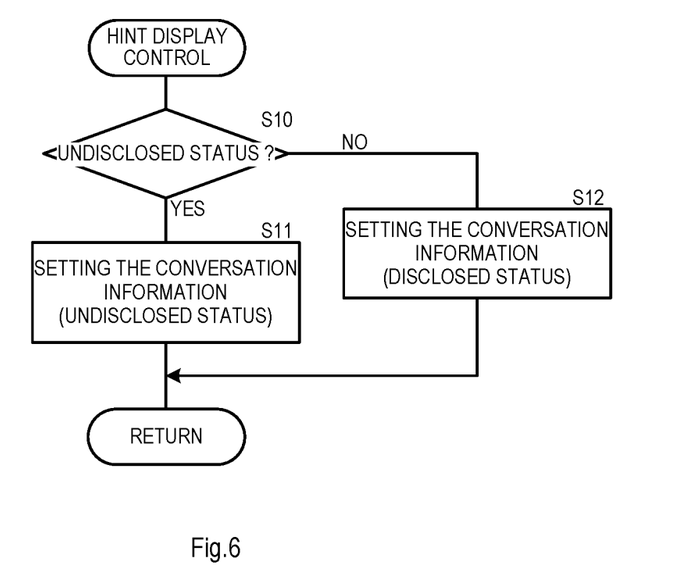
FIG. 6 is a flowchart illustrating display process of the conversation of the character providing hits-and-tips.

The display process for the conversation (hint) of the hint character 202 will be explained in detail by referring to FIG. 6.

This process is executed by the control unit 20 in the server device 2.

This process is executed by the movement (movement for the information request for the quest) which the player character talks to the hint character 202.

The control unit 20 decides whether the quest chosen by the user (terminal device 3) is in an undisclosed status (Step S10).

It is decided by whether the number of times the corresponding quest ID for the quest table 232 is cleared is below 100 times.

The process will be completed by having the control unit 20 setting the conversation information for the undisclosed status (step S11) when the quest is in an undisclosed status (if YES under Step S10).

Finally, the game screen image displayed on the conversation window 203 showing the conversation for the undisclosed status based on the conversation information settings as illustrated in FIG. 3A, is generated on the image processing unit 21.

On the other hand, the process will be completed by having the control unit 20 setting the conversation information for the disclosed status (step S12) when the quest is in a disclosed status (NO under Step S10).

Finally, the game screen image displayed on the conversation window 203 showing the conversation for the disclosed status based on the conversation information settings as illustrated in FIG. 3B, is generated on the image processing unit 21.

The starting process of the quest will be explained by referring to FIG. 7A.

This process is executed by the control unit 20 in the server device 2.

This process is executed by 1 frame each (e.g. ⅟60 seconds).

The execution period of this process does not have to be in a frame unit.

The control unit 20 decides whether the player character meets the starting conditions of the quest (Step S20).

For example, it is decided by comparing each starting conditions of the present distributing quest between the present status of the player character.

The process will be completed by the control unit 20 if the quest is decided not meeting the starting conditions (if NO under Step S20).

On the other hand, the control unit 20 will set up the start of the quest (Step S21) when the quest is decided to meet the starting conditions (YES under Step S20).

The initial setting is made in order to execute the quest upon setting the start of the quest.

For example, the corresponding quest data is readout from the quest table 232 (storing unit 23) to the specified field of RAM and the status included in the user data of the player character is changed (updated) to the "executing of the quest".

The control unit 20 decides whether the quest is in an undisclosed status (Step S23).

The process of this Step is also decided based on the number of times clearing the quest as in Step S10.

The process will be completed by having the control unit 20 setting a quest acceptance display for the undisclosed status (Step S24) when the quest is decided as an undisclosed status (if YES under Step S23).

A quest acceptance display setting is set up to notice the users that the quest will begin (quest has receipt).

Undisclosed status will also be noticed if the quest is in an undisclosed status.

For example, the setting is made to display the text "undisclosed quest begin" in the game screen image.

Finally, the game screen image based on the quest acceptance display settings including the starting data of the quest is generated on the image processing unit 21.

The process will be completed by having the control unit 20 setting a quest acceptance display for the disclosed status (Step S25) when the quest is decided as a disclosed status (if NO under Step S23).

For example, the setting is made to display the text "disclosed quest begin" in the game screen image.

Finally, the game screen image based on the quest acceptance display settings including the starting data of the quest is generated on the image processing unit 21.

After the process is completed, the control unit 20 starts the execution process of the quest.

Notice for starting the quest and its status need not to be done.

The motivation to obtain the first come, first served clearing bonus of the users raised since the status of the starting quest is notified.

The notification for the start or the present status of the quest may also be made by an output of different sound according to the status and need not to be limited to the display in text format.

The status of the quest may be notified to the user right before the acceptance, when a quest is receipt by talking to the non-player character.

The notice may also be displayed during the play of the quest.

The remaining number of times clearing the quest until the accepting quest shifts from an undisclosed status to a disclosed status or the present number of times clearing the quest may also be displayed as a replacement to or in addition to the notification (display) of the quest status.

Users may anticipate the timing of the shift of the status from the display.

Users can consider the possibility of obtaining the first come, first served clearing bonus from starting the quest by taking into account their own skills.

The ending process of the quest when the quest is cleared will be explained by referring to FIG. 7B.

This process is executed by the control unit 20 in the server device 2.

This process is executed by meeting the clearing conditions for the active quest.

Figure 7A:
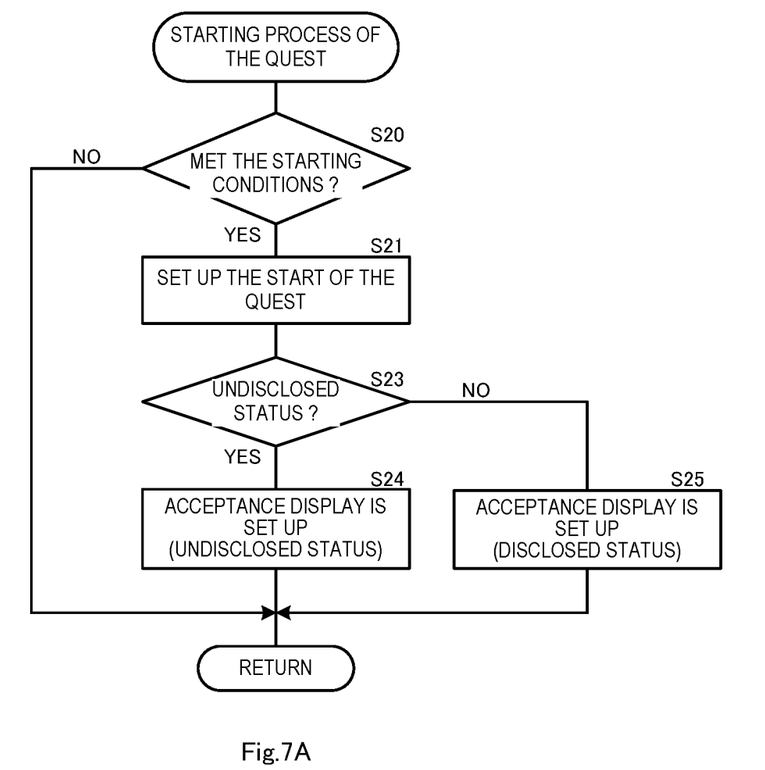
FIG. 7A is a flowchart illustrating the starting process of the quest which starts the quest.

The control unit 20 decides whether the quest is in an undisclosed status as Step 23 of FIG. 7A (Step S30).

The control unit 20 provides the reward for the undisclosed status to the player character (Step S31) when the quest is decided as in an undisclosed status (if YES under Step S30) then moves on to Step S33.

The reward for the undisclosed status is both first come, first served clearing bonus and the usual reward.

The control unit 20 provides the reward for the disclosed status to the player character (Step S32) when the quest is decided as in a disclosed status (if NO under Step S30) then moves on to Step S33.

The reward for the disclosed status is the usual reward.

The process will be completed by having the control unit 20 set up the end of the quest (Step S33).

Various settings are made in order to end the quest when setting up the end of the quest.

For example, the update for the user status of the player character and the update to increase the number of times clearing the quest corresponding to quest table 232 are made.

At Step S31 and S32, reward will be provided to each player character participating in the quest.

Number of times clearing the quest will be accumulated (increased) according to the number of player characters participating in the quest when setting up the end of the quest.

According to this embodiment the reward will be decided at the end of the quest, however this may be also decided at the start of the quest.

For example the settings for providing either of the reward for an undisclosed status or in a disclosed status when clearing the quest is made upon setting the start of the quest illustrated in Step S21 of FIG. 7A.

Figure 7B:
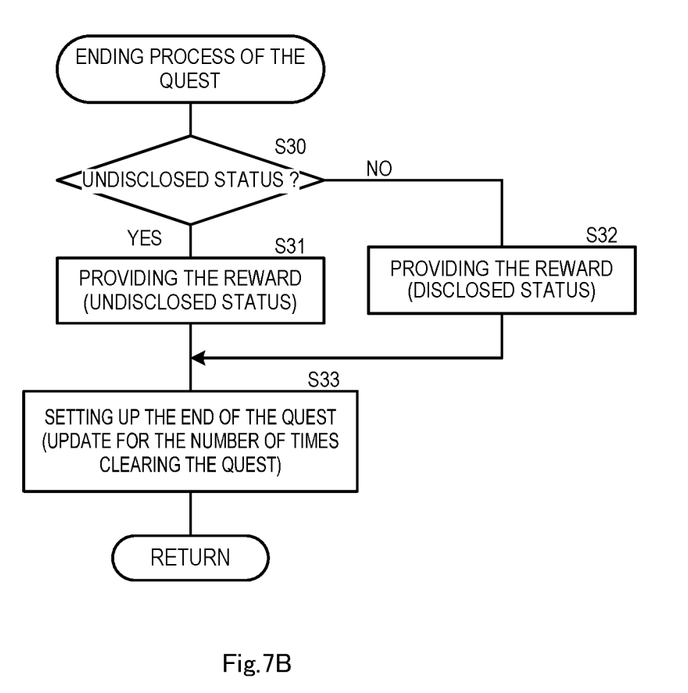
FIG. 7B is a flowchart illustrating end processing of the quest when the quest is cleared.

If the setting for providing the predetermined reward is decided to be an undisclosed status the reward for Step S31 is provided and if the settings for providing the predetermined reward are decided to be a disclosed status the reward for Step S32 is provided under Step S30 FIG. 7B.

The first come, first served clearing bonus may also be provided to the user B in FIG. 4 from this settings.

The notification (hint) to the users regarding the starting conditions for the game to clear the quest is decided according to the playing status.

As a result, the user may be provided a new amusement due to providing a purpose to search a play (starting conditions) to clear the quest from newly distributed quest with a help from hint.

Therefore may enhance the attractiveness of the play to clear the quest.

May enhance the attractiveness of the play even more, since the reward provided to clearing the quest changes according to the playing status.

The notification to the user decided to be provided according to the playing status includes not informing of such notification (no notification provided) to the user.

For example, not informing the quest when the quest is in an undisclosed status and only informing the quest when the quest is in a disclosed status.

According to this embodiment, the display (notification) for the information (hint) regarding the starting conditions of the quest is made by the hint character on the display in text format which is not limited to this display.

For example, this may also be displayed on a virtual information media within the game such as on a newspaper or a message board.

This may be made by preparing a field to store the email address in the user data to the storing unit of the server device and have the server device send out the information through this email address.

In addition to this, an application program different from executing the game, may be installed to a terminal device such as a mobile phone in order to display the hint, and have the information displayed on the displaying unit of the terminal device by executing this application program.

In this case, a request is made to send out the hint from the terminal device by executing the application program to the server device.

According to this embodiment, the hint provided by the hint character differs from an undisclosed status to a disclosed status of the quest, however this is not limited to such settings but this may be made by multiple steps. The provision of the reward may also be made by multiple steps.

The number of steps for the status of the quest and the provision process of the reward need not to be the same.

Moreover the quest until the receiving quest shifts from an undisclosed status to a disclosed status or the present number of times clearing the quest may also be displayed as a replacement to or in addition to the notification (display) of the quest status.

For example, hint character 202 A which a hint illustrated in FIG. 3A will be placed in the game field 200 in an undisclosed status and hint character 202 B which a hint illustrated in FIG. 3B will be placed additionally in the game field 200 after becoming a disclosed status.

The location of the settings may be anywhere in the game field 200 so long as the player character is able to talk to the hint character 202 A and 202 B.

According to this embodiment, the hint varies according to the number of times clearing the quest, however, the settings need not to be limited to this procedures but may vary according to the play status of the quest.

For example, hint may vary after a certain time from the distribution of the quest.

Hint may vary according to the accumulated number of acceptance of the quest instead of the number of times clearing the quest.

Hint may also be based on counting the accumulated number of times for clearing the quest only with those taking a short time (within the predetermined time limit) to clear the quest.

According to this embodiment, number of times for clearing the quest increases even if the same user (player character) clears the same quest for a multiple of times however the number of times for clearing the quest only for the first time may also be subject to the counting times.

For example, to prepare the clearing user ID for each quest ID for quest table 232.

To store the user ID for those users clearing the quest in the clearing user ID when counting the number of times clearing the quest.

To prevent counting the number of time clearing the quest when the user has cleared the quest for more than twice since the user ID for such user is stored in the clearing user ID.

According to this embodiment, the same reward as the previous clearing status will be provided so long as the status of clearing the quest is the same as the previous clearing status even if the same quest has been cleared for a multiple of times and a different reward may also be provided according to the number of times for clearing the quest.

For example, to provide twice the number of reward for clearing the quest for the first time, as a first come, first served clearing bonus when clearing the quest for the second time in an undisclosed status with the same player character and the same quest.

According to this embodiment, it is not limited to execute the game which generates more than one player character in a single game space so long as the game is to generate the player character in the common game space.

For example, a multiple of common game space has been generated and a player character is generated at one of such game space.

A game may also be generating only one player character in a single game space.

According to this embodiment, the game is played under virtual three dimensional spaces but the game need not to be limited to these settings.

The game may also be applied to an adventure game or a simulation game under two dimensional space.

According to this embodiment, the game system is equipped with the server device and a terminal device however, this also may be equipped only with multiple terminal devices.

Under such case, one of the multiple terminal devices may be used as the host terminal device with a function of the server device as described here above.

According to this embodiment, the server device functions as a quest control unit however the control unit in the terminal device may also function as the quest control unit.

Under such case, the server device may control the update for the user data and the quest table.

The terminal device executes the game for playing the quest based on the information for the quest table received from the server device and requests the update for the number of times clearing the quest.

The game is proceeded by receiving the operation information for other game devices through the network line when playing the game with multiple users (player characters).

The game may also be proceeded by having both the server device and the terminal device coordinate to work together and function as a quest control unit.

For example, server device is responsible for the process related to the game and each terminal device generates the game screen image based on the data received from the server device.

According to this embodiment, the present invention may also be applied to the game when the player character for multiple users (terminal device 3) play the same quest as one party even under the case when one player character plays the game.

The same reward may be provided to each of the player character which consists the party by clearing the quest.

The invention claimed is:

1. A game system comprising:
a terminal device; and
a server device connected via a network to the terminal device by which a user executes a video game in which a player character plays a quest in a game space,
the server device includes
a chassis;
a quest data storing unit configured within the chassis to store quest data including starting conditions for the player character to start the quest,
a playing status storing unit configured in the chassis to store playing status of the quest of the player character,
a quest control unit configured in the chassis to permit the start of the quest when the player character has met the starting conditions, and
a hint control unit configured in the chassis to notify the information for the starting conditions based on the quest data to the user through the terminal device,
wherein the playing status storing unit acquires the playing status from the quest control unit and updates the playing status,
wherein the hint control unit determines the information for the starting conditions based on the playing status,
wherein the playing status storing unit stores information that the quest is cleared (hereinafter clearing status) as the playing status,
wherein the clearing status is an accumulated number of times clearing the quest or an accumulated number of the player character clearing the quest, and
wherein the hint control unit determines the information to define the starting conditions according to the increase of the accumulated number of times clearing the quest or the accumulated number of the player character clearing the quest.

2. The game system according to claim 1,
wherein the terminal device is connected to the server device through the network and has the each player character, which is operated by the user through the terminal device in the common game space, play the quest, and
wherein the playing status storing unit accumulates the number of times clearing the quest or the number of the player character clearing the quest only for the first time the player character has cleared.

3. The game system according to claim 2,
wherein the quest data include the plurality of reward data provided to the player character when clearing the quest in each and every quest, and
wherein the quest control unit provides the reward based on the playing status to the player character clearing the quest.

4. The game system according to claim 1,
wherein the quest data include the plurality of reward data provided to the player character when clearing the quest in each and every quest, and
wherein the quest control unit provides the reward based on the playing status to the player character clearing the quest.

5. The game system according to claim 3,
wherein the quest control unit further comprises a playing status notifying unit notifying the information for the current playing status or the reward based on the playing status to the user through the terminal device, and
wherein the quest control unit provides the reward based on the playing status to the player character clearing the quest.

6. The game system according to claim 4,
wherein the quest control unit further comprises a playing status notifying unit notifying the information for the current playing status or the reward based on the playing status to the user through the terminal device, and
wherein the quest control unit provides the reward based on the playing status at the point of clearing the quest to the player character clearing the quest.

7. The game system according to claim 1,
wherein the quest data storing unit and the playing status storing unit are equipped in the server device, and
wherein the quest control unit and the hint control unit are equipped in the server device or in the terminal device.

8. A non-transitory computer readable medium storing a game program making a server device, which is connected to a terminal devices operated by a user via a network and is included in a game system that executes a video game making a player character operated by the user through the terminal device play a quest in a game space, the server device including a chassis, the game program making the server device function as:
- a quest data storing unit configured in the chassis to read a quest data from a data storing part including starting conditions for the player character to start the quest;
- a playing status storing unit configured in the chassis to store playing status of the quest of the player character in the data storing part;
- a quest control unit configured in the chassis to permit the start of the quest when the player character has met the starting conditions;
- a hint control unit configured in the chassis to notify the information for the starting conditions based on the quest data to the user through one of the terminal device,
- wherein the playing status storing unit acquires the playing status from the quest control unit and updates the playing status in the data storing part,
- wherein the hint control unit determines the information for the starting conditions based on the playing status,
- wherein the playing status storing unit stores information that the quest is cleared (hereinafter clearing status) as the playing status,
- wherein the clearing status is an accumulated number of times clearing the quest or an accumulated number of the player character clearing the quest, and
- wherein the hint control unit determines the information to define the starting conditions according to the increase of the accumulated number of times clearing the quest or the accumulated number of the player character clearing the quest.

* * * * *